United States Patent [19]
Haefliger et al.

[11] 4,352,556
[45] Oct. 5, 1982

[54] REFLECTOR FOR ELECTROOPTICAL DISTANCE MEASUREMENT

[75] Inventors: Erwin Haefliger, Buchs; Fritz Hinden, Aarau; Aldo Lardelli, Schöftland, all of Switzerland

[73] Assignee: Kern & Co. AG, Aarau, Switzerland

[21] Appl. No.: 131,840

[22] Filed: Mar. 19, 1980

[30] Foreign Application Priority Data

Apr. 11, 1979 [CH] Switzerland .................. 3430/79

[51] Int. Cl.³ .............. G01C 3/10; G02B 17/02; G01C 1/00
[52] U.S. Cl. .................. 356/1; 350/100; 350/102; 356/5; 356/144; 356/145; 356/146; 356/150
[58] Field of Search ............ 356/1, 4, 5, 144–146, 356/150; 350/100, 102

[56] References Cited

U.S. PATENT DOCUMENTS 3,348,448  10/1967  Callahan .................. 356/144
3,758,212   9/1973  Messler et al. .............. 356/145

OTHER PUBLICATIONS

Kern DM 501 Electro-Optical Dist. Meter Operating Manuel, Kern & Co. Ltd., Switzerland, 3-1978.

*Primary Examiner*—S. C. Buczinski

[57] ABSTRACT

A reflector for electrooptical measurement of the distance between a first (3) and a second point (4) is arranged with a right angle sighting device (13) in a common case (8). The reflector (6) may thus be set up at a point (5) where the directions to the first (3) and second points (4) form a right angle. This facilitates the distance measurement between points (3, 4) that are not suited for the set up of reflectors or where visual contact between the points (3, 4) is impaired by an obstacle (1).

5 Claims, 3 Drawing Figures

1

REFLECTOR FOR ELECTROOPTICAL DISTANCE MEASUREMENT

BACKGROUND OF THE INVENTION

1. Field of the Invention

This invention relates in general to electrooptical distance measurement apparatus, such as may be used in field and land surveying. More in particular, the measurement may be facilitated, where visual contact between the end points of the distance is impaired or obstructed, e.g. by a forest, house, mountain, etc., or where one of such end points is not accessible.

2. Description of the Prior Art

The well known electrooptical measurement of distances between points may be difficult if such points have a limited accessibility. If a point is part of a wall or house corner, the optical reflector, due to its shape, may not be placed at or above the point. Furthermore visual contact over the distance may be impossible. In the first case it is known to place certain points of the reflector housing, provided for this method, at the point to be measured. (See instructions for use of "Electrooptical distance measurement device Kern DM 501" available from Kern & Co. AG, CH-5001 Aarau, Switzerland). Known sighting devices inserted into the tilting axis of the reflector case may also be supported on such point and at the same time used to aim the reflector on the master station at the other end of the distance. Thus the reflector is set up with a known eccentricity extending parallel or at a right angle to the distance, which has to be taken into account.

In case of no visual contact over the distance it is known to find, by means of a right angle sighting device, a point with visual contact to both ends of the distance, where the directions to said end points form a right angle. The reflector is then placed at this auxiliary point to measure the distances to the end points, and the distance is calculated from the measured distances. These known methods imply an appreciable amount of work and apparatus.

An object of the present invention is, therefore, to provide a reflector for electrooptical measurement of the distance between points, which may be set up in a simple way and without accessories at an auxiliary point at a given angle and near to the distance and facing one of the points.

The foregoing object, other objects as well as the numerous advantages of the present invention are set forth in the following disclosure.

SUMMARY OF THE PRESENT INVENTION

The present invention comprises a reflector for electrooptical measurement of the distance between a first and a second point in cooperation with a master station at the first point, with a right angle sighting device near to the reflector. The sighting device is arranged with the reflector at a distance from the second point by a means allowing concurrent observation of markers both at the first and second points. The directions of the markers with respect to a reference point at the reflector form a right angle only if the marker images, as observed, are coincident.

An embodiment of the reflector comprises a triple mirror tiltable around a horizontal axis for reflecting the measurement beam back to the first point and a pentaprism near to the triple mirror for sighting the marker at the second point at a right angle when the marker at the first point near the master station is observed in a straight line at the side of the pentaprism. For the latter a holder is provided for insertion into side openings of a reflector case by means of a bayonet joint.

Other objects, features and advantages of the present invention will be apparent from the following detailed description of certain preferred embodiments thereof when taken in conjunction with the accompanying drawings.

DESCRIPTION OF THE PREFERRED EMBODIMENTS

As known in electrooptical distance measurement an infrared light beam with modulated intensity is transmitted from the master station at a first end of the distance to a point at the other end of the distance. At this point a reflector is set up for reflecting the beam, back to the master station, where the beam transit time is found by means of an electrical circuit. Known reflectors are made up of triple mirrors, whereby an incident beam may be reflected back almost exactly on its incident path (with a directional change of 180°) even if the reflector axis is not aligned with the beam axis. In most cases, however, these axes are aligned to get a sufficient signal strength of the reflected beam.

Figure 1:
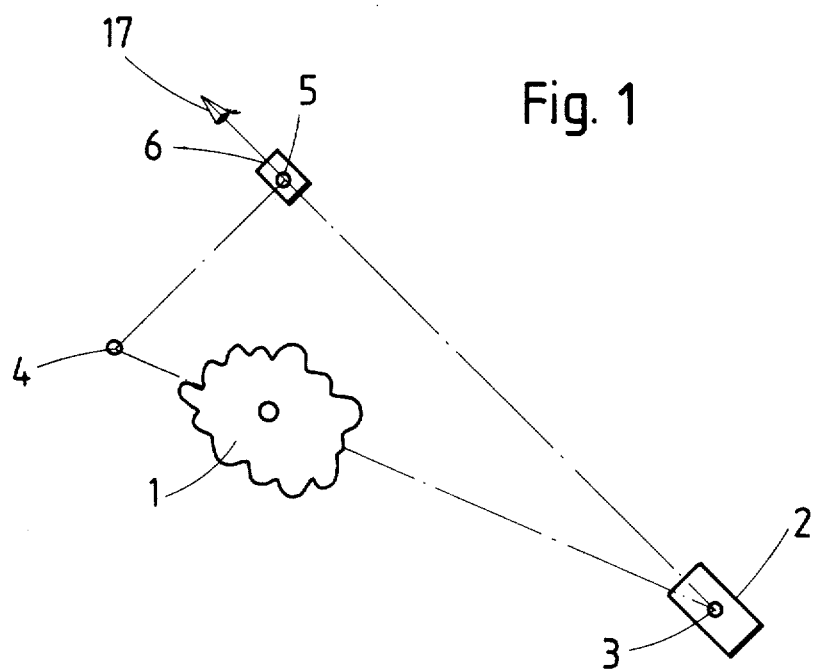
FIG. 1 illustrates the use of a reflector for electrooptical distance measurement according to the invention without visual contact between the end points of the distance.

In FIG. 1 an obstacle 1 is shown on the distance between end points 3 and 4, hence a direct distance measurement is impossible due to beam interruption. To circumvent the obstacle 1 a supplementary point 5 with visual contact to the point 3 and 4 is inserted with a right angle between points 3, 5 and 4. A reflector 6 is set up at point 5 to measure the distances between points 3, 5 and 4, 5. Therefor a reflector 6 according to the invention is used as shown in detail in FIG. 3.

Figure 2:
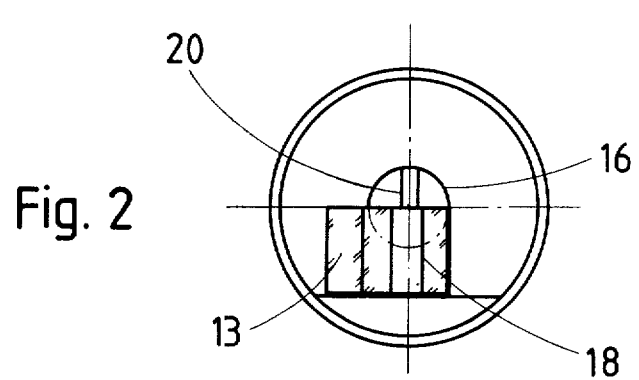
FIG. 2 shows the visual field for an observer at the reflector when set up as in FIG. 1.

A triple mirror 7 is provided for reflecting a measurement beam coming in from point 3. A case 8 of reflector 6 has openings 9 and 10 at each side around its horizontal axis 11. A pentaprism 13 within a holder 12 inserted into opening 9 is used as a right angle sighting device. The holder 12 has diametrical cross-shaped apertures 12', 12" for sighting at a marker at point 3. Thus a visual field 16 for an observer 17 is obtained as shown in FIG. 2, where the cross-shaped apertures 12', 12" have been omitted for the sake of clearness. The field 16 is geometrically divided by pentaprism 13, covering the lower part. The observer 17, when looking into holder 12, will see a marker 20 at point 3 above pentaprism 13, and the image 18 of a marker at point 4 at an angle of 90° through pentaprism 13.

At coincidence of the images 20, 18 within the visual field 16 the lines of sight 5, 3 and 5, 4 will form a right angle at their point of intersection 19, the triple mirror 7 at the same time facing master station 2 at point 3. The reflector 6 is now set up correctly for effecting the electrooptical measurement of distance 3, 5 at master station 2. The distance 4, 5 is usually much shorter than 3, 5 and may be measured electrooptically or by other known means. The required distance 3, 4 may then be calculated, as is well known, by $3, 4 = \sqrt{(3,5)^2 + (4,5)^2}$.

Figure 3:
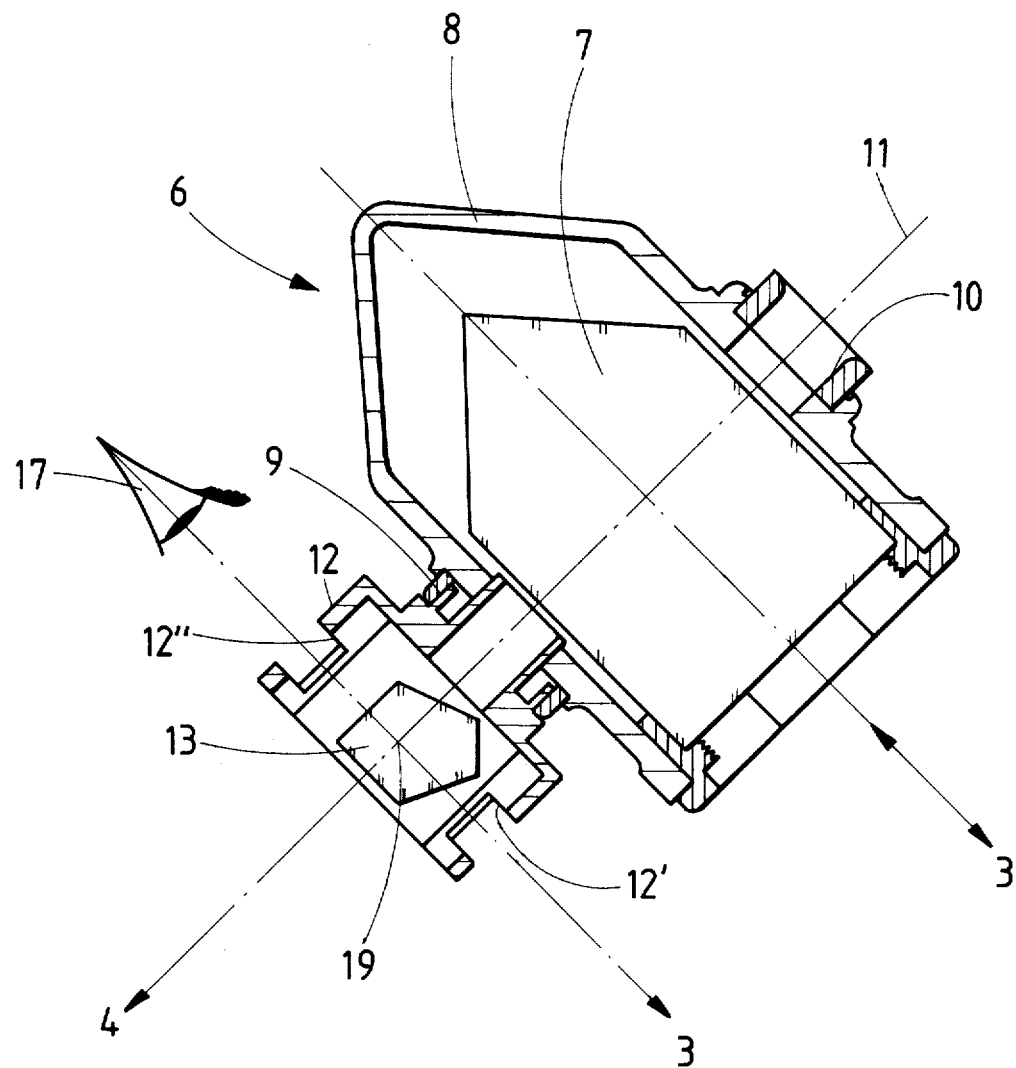
FIG. 3 illustrates an embodiment of the reflector according to the invention in detail with triple mirror and pentaprism in sectional view.

As shown in FIG. 3 only in sectional view, the side openings 9, 10 of case 8 are configured like a bayonet joint. The outer diameter of the insert of opening 10 fits snugly into opening 9, whereas prism holder 12 has two concentric necks for insertion into opening 9 as well as opening 10. Thus several reflector cases may be joined on a common horizontal axis to obtain an array with an increased reflecting area. The pentaprism 13 is inserted always into the reflector case opening facing point 4 (see FIG. 1) for sighting the marker at point 4 through prism 13. If prism 13 is inserted into opening 10 it covers the upper part of the visual field shown in FIG. 2, the marker at point 3 then being observed through the lower part of field 16.

Various modifications, changes and embodiments of the invention have been suggested, others may be obvious to those skilled in the art. Known reflectors with side apertures for joining in an array may easily be supplied with right angle sighting devices according to the invention. This disclosure is to be taken as illustrative of the present invention and not limiting thereof.

We claim:

1. A reflector for electrooptical measurement of the distance between a first and a second point in cooperation with a master station at the first point with: a right angle sighting device near to the reflector (6); means for arranging the right angle sighting device (13) with the reflector (6) at a distance from the second point (4) for concurrent observation of markers (20, 18) both at the first (3) and second points (4), the directions of the markers with respect to a reference point (19) at the reflector (6) forming a right angle only if the marker images (20, 18), as observed, are coincident; a triple mirror (7) tiltable around a horizontal axis (11) for reflecting the measurement beam back to the first point (3) and a pentaprism (13) near to the triple mirror (7) for sighting the marker (18) at the second point (4) at a right angle when the marker (20) at the first point (3) near the master station (2) is observed in a straight line along the side of the pentaprism (13); comprising further a case (8) with an opening (9,10) at each side around the horizontal axis and a holder (12) for the pentaprism that may be inserted into each one of the openings (9, 10) as required.

2. A reflector as claimed in claim 1, comprising a holder (12) and a case (8) with side openings (9, 10) each configured with a bayonet joint.

3. A reflector as claimed in claim 1, comprising means for arranging the pentaprism with the triple mirror to be tilted independently of each other.

4. A reflector as claimed in claim 1, comprising a right angle sighting device (13) with a holder (12) having apertures (12', 12") within its rim for sighting at the markers (20, 18).

5. A reflector as claimed in claim 4, wherein the apertures (12', 12") within the rim of the holder (12) allow the reflector (6) to be aimed at the first point (3).

* * * * *